UNITED STATES PATENT OFFICE.

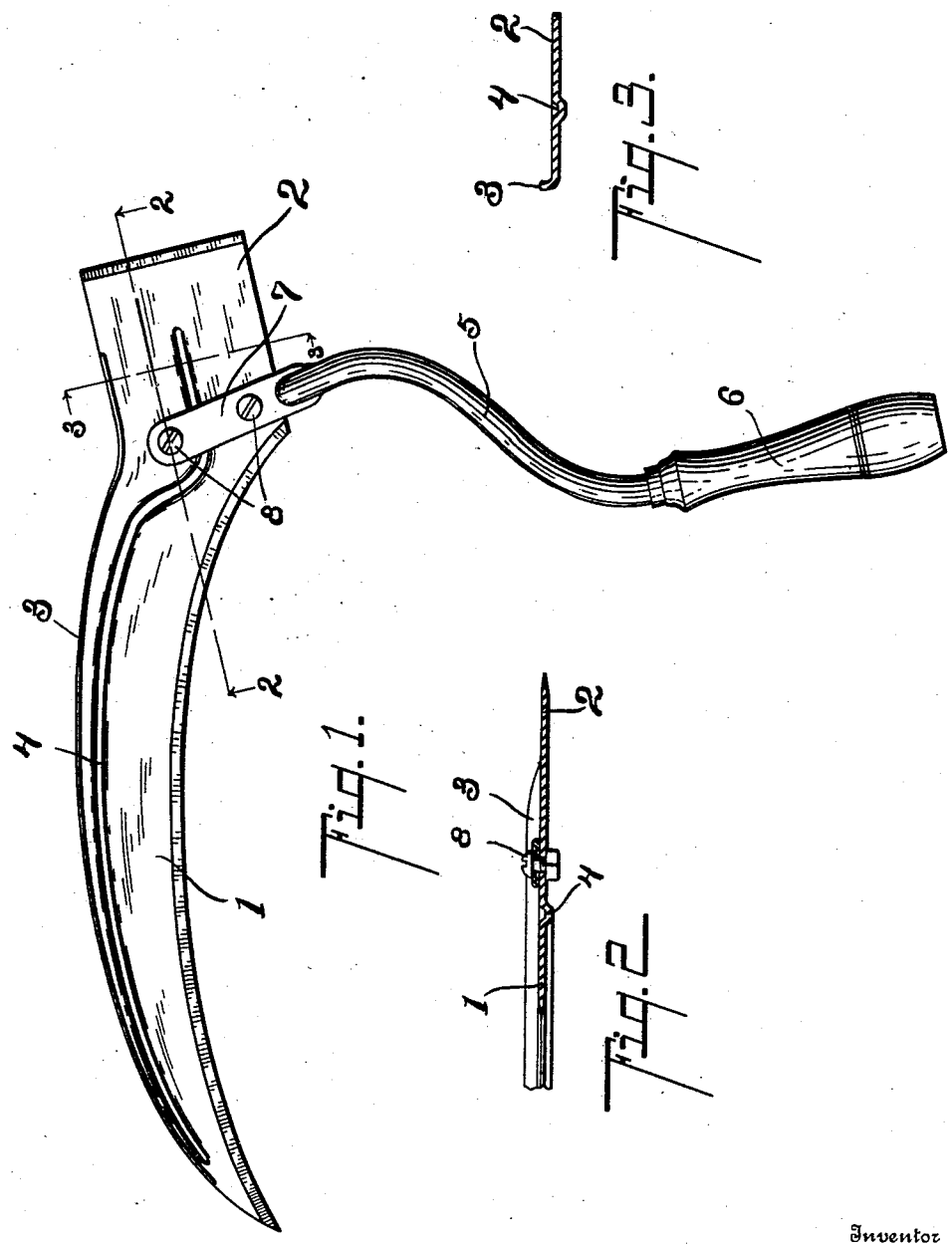

JAMES ARTHUR HENRY, OF STURGIS, MICHIGAN, ASSIGNOR TO WILLIAM T. FAVORITE AND EDWARD B. GRAY, DOING BUSINESS AS COPARTNERS UNDER THE FIRM-NAME OF THE UTILITY MANUFACTURING COMPANY, OF STURGIS, MICHIGAN.

SICKLE.

No. 912,375.   Specification of Letters Patent.   Patented Feb. 16, 1909.

Application filed November 7, 1907. Serial No. 401,140.

*To all whom it may concern:*

Be it known that I, JAMES ARTHUR HENRY, a citizen of the United States, residing at Sturgis, St. Joseph county, Michigan, have invented certain new and useful Improvements in Sickles, of which the following is a specification.

This invention relates to improvements in sickles.

The main object of this invention is to provide an improved sickle having a spud-like blade in addition to the regular sickle blade.

A further object is to provide an improved tool embodying these features, in which the blades may be formed of sheet metal, and, at the same time, the structure is strong and durable.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a plan view of my improved tool. Fig. 2 is a detail section taken on a line corresponding to line 2—2 thereof. Fig. 3 is a detail section, taken on a line corresponding to line 3—3 of Fig. 1.

In the drawing, similar reference characters refer to similar parts throughout the several views, and the sectional views are taken looking in the direction of the little arrows at the ends of the section lines.

Referring to the drawing, the sickle blade 1, which is preferably of the well-known shape, is provided with an extension at its base forming a spud-like blade 2. These blades are preferably formed of sheet metal, and are provided with an upwardly-projecting flange 3 on their rear edges, and with a longitudinal rib 4 punched therein to give the desired rigidity. The rib 4 is located towards the rear edge of the sickle blade and extends into the spud-like blade, being preferably located centrally thereof. The handle 5 is secured to the base of the sickle blade preferably extending across the rib 4. This greatly strengthens the blades at their point of attachment to the handle, which is, of course, the point where the greatest strain occurs. The flange 3 also being continuous, greatly strengthens the blades at their point of attachment to the handle, so that they may be made of comparatively light material and still be very strong. The hand piece 6 of the handle is preferably arranged substantially parallel with the cutting edge of the blade 2, as is illustrated. The handle 5 is preferably formed of a piece of tubing, the end 7 thereof being flattened and secured to the blade by suitable screw bolts, as 8. It is obvious, however, that rivets might be substituted for these bolts.

My improved tool is especially designed as a sickle for use in trimming lawns, and the like; and the spud-like blade is provided for removing weeds, and like foul matter from the lawn. It may be used in the same manner as a spud,—that is, by pushing into the ground, the user grasping the rear edge of the sickle blade and the handle. Or, it may be used somewhat like a hatchet, if preferred.

My improved sickle, or tool, is very economical to produce and may be made of light material; at the same time, it is very strong and rigid.

Having thus described my invention, what I claim as new and desire to secure by Letters Patent is:

1. A tool, comprising a sickle blade formed of sheet metal having an extension at its base, forming a spud-like blade, said blades being provided with an upturned continuous flange on their rear edges and with a longitudinal rib punched up therein, said rib being located towards the rear of said sickle blade and centrally of said spud-like blade; and a handle secured at the base of said sickle blade, across the said rib, the hand piece of said handle being substantially parallel with the cutting edge of said spud-like blade.

2. A tool, comprising a sickle blade formed of sheet metal having an extension at its base, forming a spud-like blade, said blades being provided with a longitudinal rib punched up therein, said rib being located towards the rear of said sickle blade and centrally of said spud-like blade; and a handle secured at the base of said sickle blade, across the said rib, the hand piece of said handle being substantially parallel with the cutting edge of said spud-like blade.

3. A tool, comprising a sickle blade formed of sheet metal having an extension at its base, forming a spud-like blade, said blades being provided with an upturned continuous flange on their rear edges; and a handle secured at the bases of said sickle and spud-like blades the cutting edges of said sickle and spud-like blades being relative to each other in planes approximating a right angle.

4. A tool, comprising a sickle blade having an extension at its base, forming a spud-like blade; and a handle secured at the bases of said sickle and spud-like blades, the hand piece of said handle being substantially parallel with the cutting edge of said spud-like blade the cutting edges of said sickle and spud-like blades being relative to each other in planes approximating a right angle.

5. A tool, comprising a sickle blade; a spud-like blade at the base of said sickle blade; and a handle secured at the bases of said sickle and spud-like blades the cutting edges of said sickle and spud-like blades being relative to each other in planes approximating a right angle.

In witness whereof, I have hereunto set my hand and seal in the presence of two witnesses.

JAMES ARTHUR HENRY. [L. S.]

Witnesses:
THEO. G. JACOBS,
E. B. GRAY.